US005762356A

United States Patent [19]

Kunze et al.

[11] Patent Number: 5,762,356

[45] Date of Patent: Jun. 9, 1998

[54] WHEELCHAIR WITH CLADDING PARTS

[75] Inventors: Karl-Heinz Kunze, Kiel; Peter Mackert, Lammershagen, both of Germany

[73] Assignee: Ortopedia GmbH, Kiel, Germany

[21] Appl. No.: 525,373

[22] Filed: Sep. 7, 1995

[30] Foreign Application Priority Data

Sep. 13, 1994 [EP] European Pat. Off. .............. 94114371

[51] Int. Cl.$^{6}$ .............. B62J 39/00

[52] U.S. Cl. .............. 280/304.1; 280/250.1

[58] Field of Search .............. 280/250.1, 304.1, 280/288.4; D12/131, 132, 133; 297/DIG. 4; 296/191, 146.5, 146.7

[56] References Cited

U.S. PATENT DOCUMENTS

| | | | |
|---|---|---|---|
| D. 306,520 | 3/1990 | McCarthy | D12/133 |
| 4,795,214 | 1/1989 | Holdt | 297/DIG. 4 |
| 5,121,938 | 6/1992 | Gross et al. | 280/304.1 |
| 5,154,331 | 10/1992 | Sanders | D12/131 |
| 5,176,393 | 1/1993 | Robertson et al. | 280/250.1 |
| 5,333,921 | 8/1994 | Dinsmoor, III | 297/DIG. 4 |
| 5,505,412 | 4/1996 | Van Hamme | 297/DIG. 4 |

FOREIGN PATENT DOCUMENTS

| | | | |
|---|---|---|---|
| 2168018 | 6/1986 | United Kingdom | 280/289 |

*Primary Examiner*—Eric D. Culbreth
*Assistant Examiner*—Gary Savitt
*Attorney, Agent, or Firm*—Breiner & Breiner

[57] ABSTRACT

The invention relates to a wheelchair having a frame, a seat, a backrest, wheels and attachments fixed to the frame, characterized in that colored cladding parts can be detachably fixed, particularly by plug or clamp connections, to substantially any part or component of the wheelchair. This makes it possible in a simple and inexpensive manner to bring about a variable color design for the overall wheelchair. The cladding parts are preferably constructed as flat plastic parts which can be locked by means of projections formed in or on the cladding parts into corresponding recesses in the wheelchair or can be slid into longitudinal grooves in the frame of the wheelchair.

6 Claims, 3 Drawing Sheets

WHEELCHAIR WITH CLADDING PARTS

FIELD OF INVENTION AND BACKGROUND OF THE INVENTION

The invention relates to a wheelchair having a frame, a seat, a backrest, wheels and attachments such as armrests, foot supports fixed to the frame and the like.

An increasing desire exists for aesthetic design or visual individualization in wheelchairs based on the ideas and wishes of a user of the wheelchair. Hitherto, account has only been taken of these wishes to the extent that the frame parts and attachments affixed thereto have been produced in different paint finishes. However, this procedure has led to problems in that in the mass production typical in this area only a limited number of colors can be offered, the manufacturer must maintain large stocks, and the coloring of customer-specific wishes can not be taken into account following delivery to a sales outlet.

The invention addresses these problems by providing a wheelchair which, even after delivery to a sales outlet or to a user, can undergo a color change with little cost or effort.

BRIEF DESCRIPTION OF THE INVENTION

According to the invention, the above-noted problems are solved in that, in the case of a wheelchair of the aforementioned type, colored cladding, covering or facing parts are provided for detachable fitment onto substantially any part or component of a wheelchair thereby providing for a variable color finish to the overall wheelchair. "Colored" or "color" as used herein is understood to include solid or partial colors, prints, designs, or the like in relation to the cladding parts.

As a result of the detachable fitting of colored cladding parts or decorative elements, a large portion of the lateral faces of the wheelchair can be colored. The colored cladding parts can be advantageously manufactured, for example as a preferred embodiment, as flat plastic parts or plates. As a result of the variable design, there is no need for different paint or varnish finishes of the main parts of the wheelchair. In addition, storage of the cladding parts is much less expensive than storage of differently painted, completely installed wheelchairs or their main sub-assemblies. The final choice of color or individual changes to the wheelchair design can take place without significant effort or cost in a customer-specific manner in a sales outlet or, if so wished by a user, at any later time.

According to a preferred embodiment of a wheelchair according to the invention, plug or clamp connections are provided in or on the cladding parts by means of which the cladding parts are detachably fitted to a part or component to be clad. The plug connections can be in the form of boss-like projections formed as part of the cladding parts which can be inserted into corresponding recesses or bores in a part or component of the wheelchair.

According to a particularly preferred embodiment, the cladding parts are constructed as flat plates which are dimensioned in such a way that they can be inserted and held in longitudinal grooves provided in frame sections of the wheelchair by sliding or snapping into the grooves in such a way that the plates are slightly curved or arched outwards and consequently are held securely in the grooves due to resiliency. Such construction is characterized by a particularly simple attachment of the cladding parts and inexpensive manufacturability of the cladding parts or decorative elements.

BRIEF DESCRIPTION OF THE DRAWINGS

A preferred embodiment of a wheelchair with cladding parts according to the invention is described in greater detail hereinafter and shown in the following attached drawings.

DETAILED DESCRIPTION OF THE PRESENTLY PREFERRED EMBODIMENTS

Figure 1:
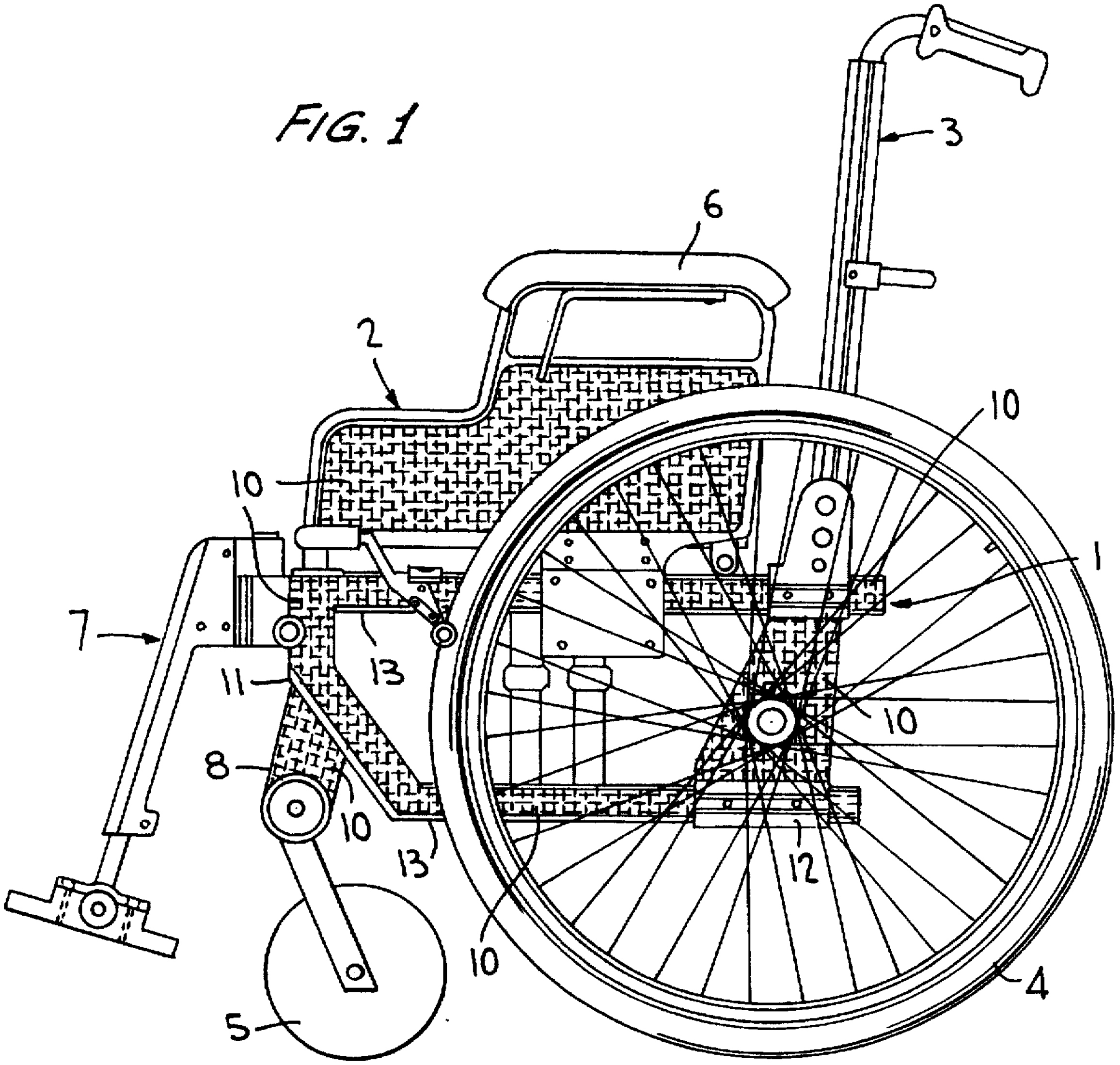
FIG. 1 is a side view of a wheelchair according to a preferred embodiment with fitted cladding parts thereon.
Figure 2:
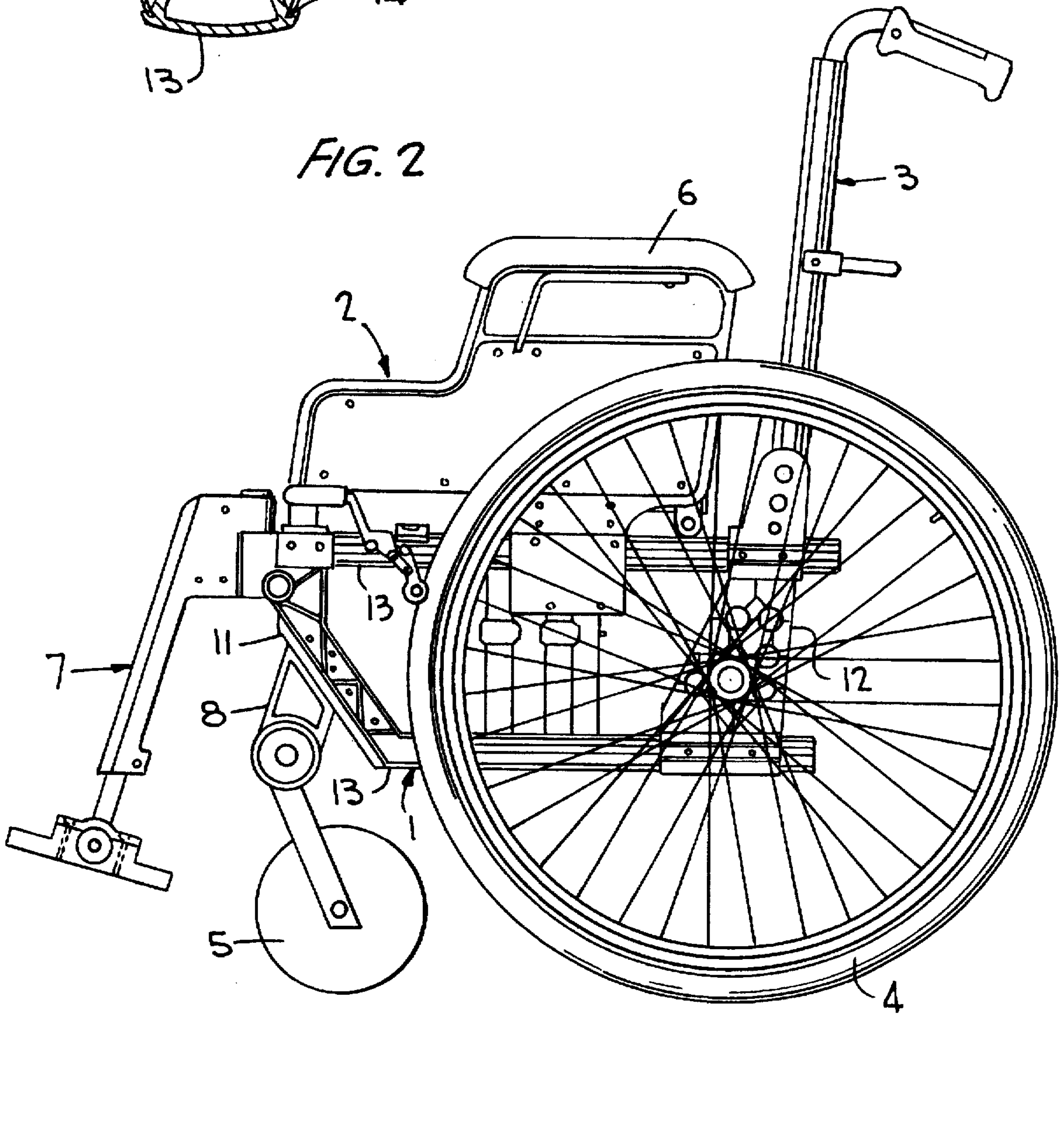
FIG. 2 is a side view of the wheelchair of FIG. 1 shown without the cladding parts.

FIGS. 1 and 2 show a wheelchair according to a preferred embodiment of the invention, on one hand with fitted cladding parts or decorative elements (FIG. 1) and on the other without cladding parts or decorative elements (FIG. 2). The wheelchair normally has a frame 1, which carries a seat 2, a backrest 3, and driving wheels 4, as well as attachments such as armrests 6, foot supports 7 and mounting supports 8 for guide, steering or castor wheels 5.

Figure 3:
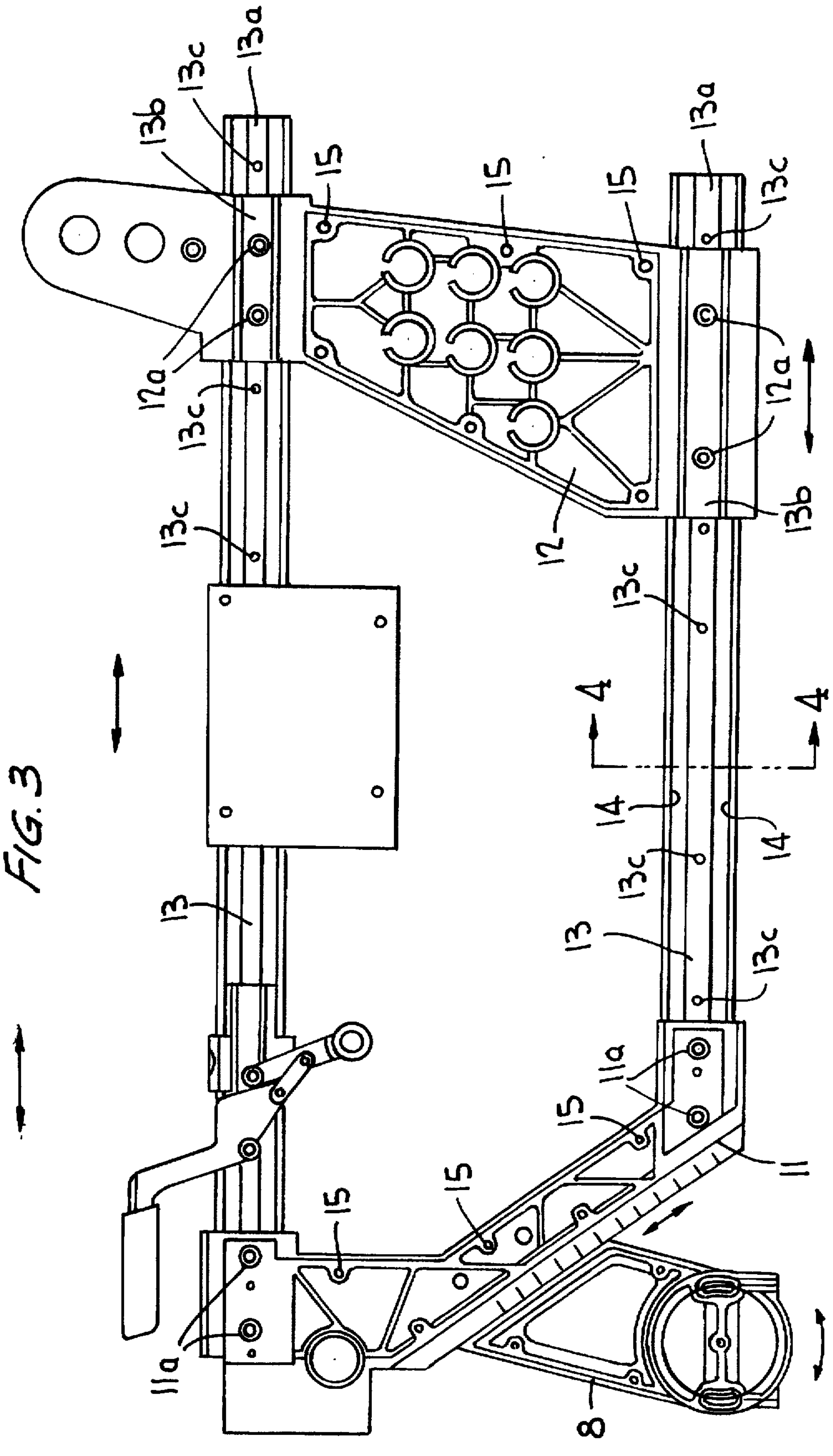
FIG. 3 is a side view of a sideframe of the wheelchair of FIGS. 1 and 2.

The frame 1 comprises two facing, interconnected sideframes, which as shown in FIG. 3, are each formed by two rigid frame parts 11 and 12 as well as elongated frame sections or profiles 13 interconnecting them. Rigid frame part 11 carries front attachments for the wheelchair, such as pivotal foot supports 7 and the vertically adjustable mounting support for guide wheels 5. The rear rigid frame part 12 has recesses for fixing backrest 3 and a driving wheel 4 thereto. In order to provide different wheel and backrest positions, frame part 12 is provided with several displaced recesses for these components.

For covering the lateral faces of the elongated frame sections 13 and frame parts 11 and 12, flat cladding parts or decorative elements 10 as shown in FIG. 1 are provided which are colored and shaped to conform to the surfaces of the parts to be covered. The cladding parts are to be fixed in a manner as described hereinafter in a detachable manner to substantially any surface, component or part of the wheelchair which contributes to the overall appearance of the wheelchair and in this way allows for variable coloring of the overall wheelchair in a simple and inexpensive manner. It is also possible to clad in a simple manner functional elements of the wheelchair components, such as stiffening ribs, screws, reception bores, and the like.

The cladding parts or decorative elements are preferably made from plastic in the form of flat plates or moldings since they can be easily and inexpensively manufactured, colored and worked. However, it is also possible to use other materials such as, for example, sheets made from various suitable metals, wood, coated papers or cardboard, and the like, as well as other coating and anodizing processes such as painting, varnishing, printing, anodizing, chromizing, and the like.

For fitting the flat cladding parts to the wheelchair, for example, frame parts 12 and 11 have recesses 15 formed therein which can lock the cladding parts 10 thereto, such as by receiving boss-like projections formed in or attached to the cladding parts. Alternatively, for fixing the cladding parts to wheelchair components, it is possible to use any suitable detachable connecting method (screws, rivets, bonding, and the like) or suitably shaped plug or clamp connecting means.

Rigid frame parts 11 and 12 are preferably each constructed in one piece and are produced by pressure die casting from aluminum, magnesium or other suitable material. The frame sections 13 are formed by continuous cast sections and are fit into corresponding guides **13*b* on the rigid frame parts 11 and 12 so that, in particular, rear frame part 12 can be slid along frame sections 13 by means of corresponding guides 13*a* and 13*b* as shown in FIG. 3 relative to the front frame part 11 and can be fixed in different longitudinal positions, either continuously or in predetermined positions, along frame sections 13. One means of fixture is as shown in FIG. 3 and includes screw holes 13*c* which are aligned with screw holes (not visible) in parts 11 and 12 as appropriate and screws 11*a* and 12*a*** passing through the aligned screw holes.

Figure 4:
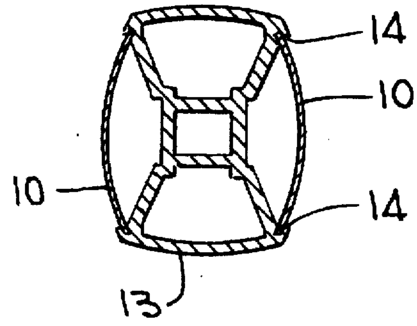
FIG. 4 is a cross-sectional view along line A—A of a frame section of the sideframe of FIG. 3.

According to FIGS. 3 and 4, the elongated frame sections 13 have longitudinally extending hollow chambers and longitudinal grooves 14. Cladding parts 10 intended for sections 13 constructed for detachable fitting purposes as flat strips will have a somewhat greater width than the spacing between the longitudinal grooves and thus are consequently inserted from the end of the sections between the longitudinal grooves 14 or can be laterally plugged or clipped in between them. As a result of the outward curvature of the resulting elastically deformed and resilient cladding parts, the cladding parts are securely held in position. Alternatively, in fixing the cladding parts, it is possible to use other suitable detachable fixing means. The snap fixing of the cladding parts in the grooves provided on the components to be clad can also be implemented by a corresponding shaping of the rigid frame parts.

On the frame sections are fitted additional attachments and components of the wheelchair, such as a brake mechanism and armrest mounting support, which are displaceable in the longitudinal direction of the sections and can be fixed either in random longitudinal positions or in predetermined positions by suitable means, such as clips, screws, bolts, or inserted into bores in the longitudinal sections.

For adapting to different longitudinal positions of the rigid frame parts and the attachments fitted to the frame sections, the cladding parts for the interposed portions of the frame sections can be cut to an appropriate length in each case.

The above description of the preferred embodiments of a wheelchair according to the invention with cladding parts serves to illustrate the invention. The cladding parts or decorative elements can also be fit by suitable detachable fixing means to other frame structures or wheelchair components.

As will be apparent to one skilled in the art, various modifications can be made within the scope of the aforesaid description. Such modifications being within the ability of one skilled in the art form a part of the present invention and are embraced by the appended claims.

It is claimed:

1. Wheelchair comprising a frame, a seat, a backrest, wheels and at least one colored cladding part, wherein each of said at least one colored cladding part is in a form of a flat plate or sheet material and is detachably fixed to at least one part or component of the wheelchair to thereby provide a variable design to the wheelchair, wherein the frame includes two facing and interconnected side frames which each have two rigid frame parts which are interconnected for positioning in a longitudinal direction by two elongated frame sections, and wherein a cladding part defined as a member of the at least one cladding part is detachably fixed to each lateral face of the two side frames formed by the rigid frame parts and the elongated frame sections and is so dimensioned that the cladding part can be slid, clipped or locked in longitudinally extending grooves provided in the elongated frame sections.

2. Wheelchair comprising a frame, a seat, a backrest, wheels and at least one colored cladding part, wherein each of said at least one colored cladding part is in a form of a flat plate or sheet material and is detachably fixed to at least one part or component of the wheelchair to thereby provide a variable design to the wheelchair, wherein the frame includes two facing and interconnected side frames which each have two rigid frame parts which are interconnected for positioning in a longitudinal direction by two elongated frame sections, wherein a cladding part defined as a member of the at least one cladding part is detachably fixed to each lateral face of the two side frames formed by the rigid frame parts and the elongated frame sections, wherein any one cladding part of the at least one cladding part which is fixed to the elongated frame sections can be different in length from any other cladding part so as to permit adaptation by a cladding part to different longitudinal positions of the two rigid frame parts along said elongated frame sections, and wherein a cladding part fixed to the elongated frame sections is so dimensioned that the cladding part can be slid, clipped or locked in longitudinally extending grooves provided in the elongated frame sections.

3. Wheelchair according to claim 1 or 2 wherein said at least one cladding part is fixed by plug or clamp connections to the at least one part or component of the wheelchair.

4. Wheelchair according to claim 1 or 2 further comprising at least one attachment selected from a group consisting of armrest, foot support, and mounting support for a guide wheel, and wherein a lateral face of the at least one attachment is coverable by the at least one cladding part.

5. Wheelchair according to claim 1 or 2 wherein the at least one cladding part has boss projections which are lockable in corresponding recesses formed in the at least one part or component of the wheelchair.

6. Wheelchair according to claim 1 or 2 wherein the at least one cladding part is made from a material selected from the group consisting of plastic, metal, wood, coated paper and coated cardboard.

* * * * *